United States Patent
Gaonkar et al.

(10) Patent No.: US 11,481,255 B2
(45) Date of Patent: Oct. 25, 2022

(54) MANAGEMENT OF MEMORY PAGES FOR A SET OF NON-CONSECUTIVE WORK ELEMENTS IN WORK QUEUE DESIGNATED BY A SLIDING WINDOW FOR EXECUTION ON A COHERENT ACCELERATOR

(71) Applicant: International Business Machines Corporation, Armonk, NY (US)

(72) Inventors: Chetan L. Gaonkar, Kumta (IN); Niranjan Behera, Malatipur (IN); Geeta Devi Akoijam, Imphal West (IN); Vamshikrishna Thatikonda, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 16/565,703

(22) Filed: Sep. 10, 2019

(65) Prior Publication Data
US 2021/0073033 A1    Mar. 11, 2021

(51) Int. Cl.
*G06F 9/50* (2006.01)
*G06F 9/48* (2006.01)
*G06F 13/16* (2006.01)

(52) U.S. Cl.
CPC .......... *G06F 9/5011* (2013.01); *G06F 9/4887* (2013.01); *G06F 13/1668* (2013.01)

(58) Field of Classification Search
CPC .. G06F 9/5011; G06F 9/4887; G06F 13/1668; G06F 9/5016
See application file for complete search history.

(56) References Cited

U.S. PATENT DOCUMENTS 5,606,685 A * 2/1997 Frandeen .............. G06F 12/128
  711/171
6,237,079 B1   5/2001 Stoney
  (Continued)

FOREIGN PATENT DOCUMENTS

JP        2002244869 A  *  8/2002

OTHER PUBLICATIONS

Hasegawa et al. JP2002244869A Description Translation, Aug. 30, 2002, [database online], [retrieved on Nov. 30, 2021] Retrieved from Espacenet using Internet <URL:https://worldwide.espacenet.com/publicationDetails/description?CC=JP&NR=2002244869A&KC=A&FT=D&ND=3&date=20020830&DB=&locale=en_EP>, pp. 1-10 (Year: 2002).*

(Continued)

*Primary Examiner* — Meng Ai T An
*Assistant Examiner* — Hsing Chun Lin
(74) *Attorney, Agent, or Firm* — Peter K. Suchecki

(57) ABSTRACT

Provided is a method, computer program product, and coherent computer system for improving memory management by establishing cooperation between an operating system and a coherent accelerator device (CAD). The CAD may retrieve a set of work elements for completion from a work queue. The CAD may determine a length of time required to complete the set of work elements. The CAD may identify a set of memory pages needed for completing the set of work elements. The CAD may communicate the set of memory pages and the length of time required to complete the set of work elements to a virtual memory manager.

16 Claims, 6 Drawing Sheets

(56) References Cited

U.S. PATENT DOCUMENTS

| | | | | |
|---|---|---|---|---|
| 8,826,284 | B1* | 9/2014 | Fuller | G06F 9/5088 |
| | | | | 718/103 |
| 9,250,962 | B2* | 2/2016 | Brech | G06F 9/4893 |
| 9,720,714 | B2 | 8/2017 | Hollinger | |
| 9,772,878 | B2* | 9/2017 | Sevigny | G06F 9/4881 |
| 9,870,256 | B2* | 1/2018 | Hou | G06F 9/54 |
| 10,853,118 | B2* | 12/2020 | Tian | G06F 9/45508 |
| 2004/0117578 | A1* | 6/2004 | Castelli | G06F 12/08 |
| | | | | 711/170 |
| 2008/0198671 | A1* | 8/2008 | Wang | G06F 5/065 |
| | | | | 365/189.05 |
| 2010/0005272 | A1 | 1/2010 | Vuletic et al. | |
| 2013/0311738 | A1 | 11/2013 | Jiang et al. | |
| 2014/0237477 | A1 | 8/2014 | Cadambi et al. | |
| 2015/0186268 | A1* | 7/2015 | Asaad | G06F 9/5016 |
| | | | | 711/202 |
| 2016/0259671 | A1 | 9/2016 | Gosalia et al. | |
| 2020/0379807 | A1* | 12/2020 | Tang | G06F 9/505 |
| 2021/0349826 | A1* | 11/2021 | Roy | G06F 13/1668 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

MANAGEMENT OF MEMORY PAGES FOR A SET OF NON-CONSECUTIVE WORK ELEMENTS IN WORK QUEUE DESIGNATED BY A SLIDING WINDOW FOR EXECUTION ON A COHERENT ACCELERATOR

BACKGROUND

The present disclosure relates generally to the field of memory management for computer systems, and more specifically, to improving memory utilization by establishing cooperation between an operating system and a coherent accelerator device (CAD).

A CAD includes an accelerator functional unit (AFU) (e.g., co-processor) that is used to supplement the functions of the primary processor (e.g., computer processing unit (CPU)). Operations performed by the CAD may be floating point arithmetic, graphics, signal processing, string processing, cryptography, compressions, encryptions, and/or I/O interfacing with peripheral devices. By offloading processor-intensive tasks from the main processor, CADs can accelerate system performance.

SUMMARY

Embodiments of the present disclosure include a method, computer program product, and coherent computer system for improving memory utilization by establishing cooperation between an operating system and a coherent accelerator device (CAD). The CAD may retrieve a set of work elements for completion from a work queue. The CAD may determine a length of time required to complete the set of work elements. The CAD may identify a set of memory pages needed for completing the set of work elements. The CAD may communicate the set of memory pages and the length of time required to complete the set of work elements to a virtual memory manager.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
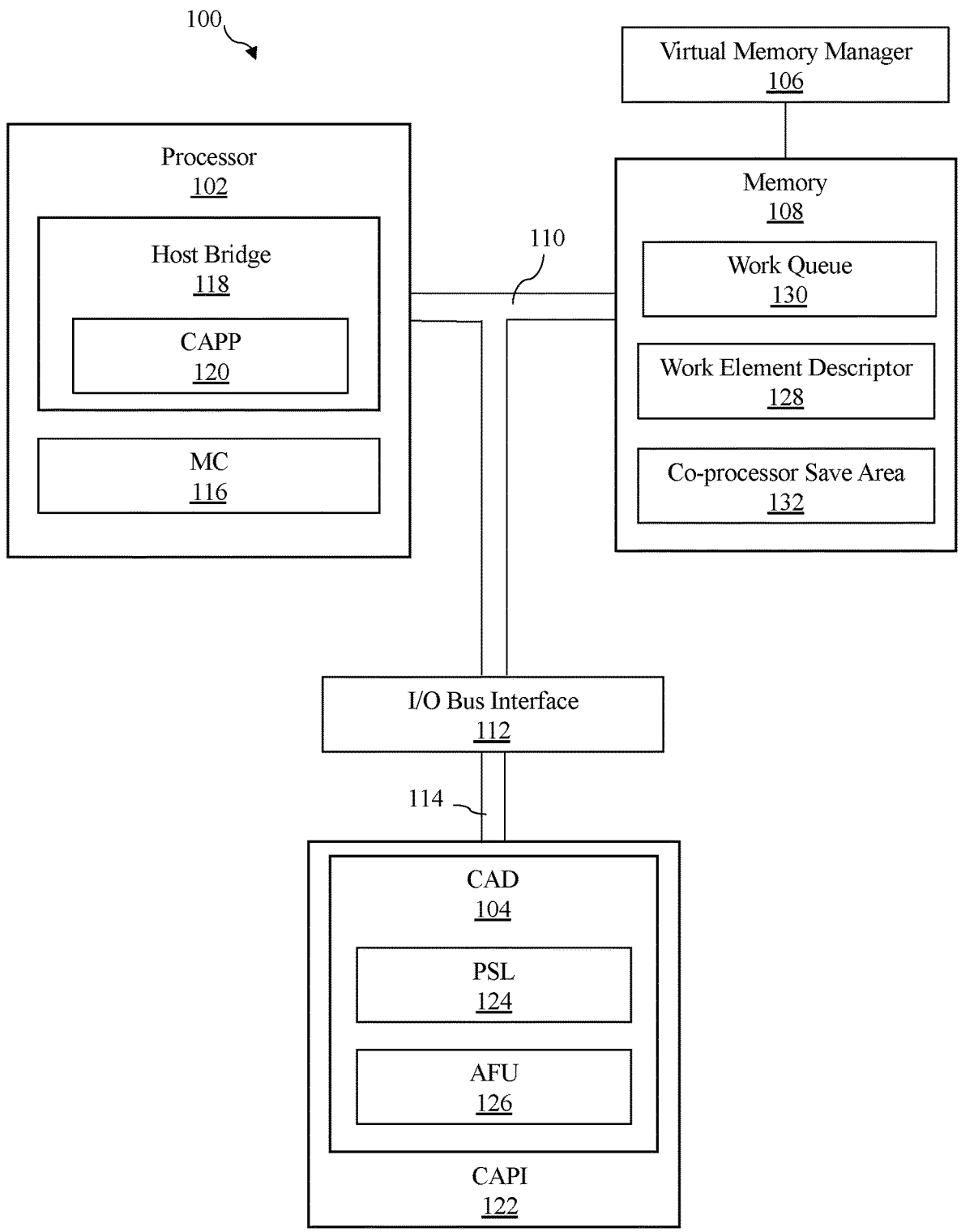
FIG. 1 illustrates a block diagram of an exemplary coherent computer system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of memory management in computer systems, and more particularly to improving memory utilization by establishing cooperation between an operating system (e.g., through a virtual memory manager and/or hypervisor) and a coherent accelerator device (CAD). While the present disclosure is not necessarily limited to such applications, various aspects of the disclosure may be appreciated through a discussion of various examples using this context.

A CAD includes an accelerator function unit (AFU) (e.g., co-processor) that is used to supplement the functions of the primary processor (e.g., computer processing unit (CPU)). Operations performed by the CAD may be floating point arithmetic, graphics, signal processing, string processing, cryptography, compressions, encryptions, and/or I/O interfacing with peripheral devices. By offloading processor-intensive tasks from the main processor, CADs can accelerate system performance.

The CAD may be communicatively coupled to a coherent accelerator processor interface (CAPI) for directly connecting a CPU to external accelerators like graphics processing units (GPUs), application-specific integrated circuits (ASICs), field-programmable gate arrays (FPGAs), or fast storage. Since the CPU and CAD share the same memory space, low latency and high speeds can be achieved because the CPU does not have to perform memory translations and memory shuffling between the CPU's main memory and the accelerator's memory spaces. An application can make use of the accelerator without specific device drivers as everything is enabled by a general CAPI kernel extension in the host operating system. The CPU and CAD can read and write directly to each other's memories and registers, as demanded by the application.

In some instances, the CPU may utilize demand paging to steal memory pages from the CAD in order to perform various computing functions. For example, a virtual memory manager of an operating system manages the residence of memory pages associated with running processes on each virtual machine (VM) and/or logical partition (LPAR). In para-virtualized embodiments, the virtual memory manager on the virtual machine and the underlying hypervisor cooperate with each other to identify pages for hypervisor page out, least recently used (LRU) page stealing, page loaning, and/or compression based on the recency/frequency of memory page access. However, the virtual memory manager generally does not take into account which memory pages are needed by a CAD to complete the various work elements (e.g., commands for initiating memory copy, encryption, compression, etc.) assigned to the CAD by various applications. In many instances, the virtual memory manager may perform demand paging, page promotions and migration, and hypervisor page stealing of the CAD's working set memory pages that were needed for completing respective work elements.

In such an instance, the CAD may page fault on a particular page not already loaded in main memory. For example, work elements may be issued by various applications running on a main processor. In embodiments, the work elements may be issued to the CAD synchronously or asynchronously. Applications that wait for the command to be completed if it is issued synchronously may become cold if the CAD has not initiated the command or has not completed the command prior to demand paging. Applications that issue work elements asynchronously may move on to other activities, however the virtual memory manager may use memory pages, that were needed by the CAD, for completing other tasks. In either instance, the probability of the virtual memory manager stealing the CAD's working set of memory pages resulting in CAD page fault is very high, thus reducing overall system performance.

Aspects of the present disclosure relate to improving memory utilization by establishing cooperation between an operating system (e.g., using a virtual memory manager) and a CAD. In embodiments, the CAD may retrieve a set of work elements for completion from a work queue. The CAD may utilize a work element descriptor to group the set of work elements into current work elements and future work elements based on work element descriptions. The CAD may determine a length of time required to complete the set of work elements and identify a set of memory pages needed for completing the set of work elements. Once identified, the CAD may communicate the length of time required to complete the work elements and the identified set of memory pages needed for completion to a virtual memory manager. In this way, the virtual memory manager is instructed not to utilize the identified set of memory pages until the length of time to complete the set of work elements decrements to zero. This allows the CAD to complete any work elements assigned to it by preventing CAD page outs caused by demand paging, page loaning, and/or page stealing.

In embodiments, the CAD may continually update the length of time and set of memory pages needed for completing the set of work elements when one or more work elements has been completed. For example, as each current work command is completed, the length of time needed to complete the set of work elements may decrease, allowing the virtual memory manager to anticipate when various memory pages may be available and utilized by the system.

In embodiments, the CAD may store a working set list comprising the identified set of memory pages and the length of time required to complete the set of work elements in a co-processor save area. The co-processor save area is configured to be accessible by both the CAD and the virtual memory manager. The working set list allows the virtual memory manger to maintain an accurate accounting of both the set of memory pages designated by the CAD for current and future work elements and the time length the memory pages will be occupied by the CAD.

In some embodiments, the CAD may use a sliding window configured to indicate to the virtual memory manager the set of working elements the CAD is currently assigned and the memory pages needed to complete the respective work elements. In this way, the CAD will designate which memory pages will be utilized for current and future work elements by indicating to the virtual memory manager which pages not to steal when demand paging is required by the system.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an exemplary coherent computer system 100, in accordance with embodiments of the present disclosure. Coherent computer system 100 includes processor 102, coherent accelerator device (CAD) 104, virtual memory manager 106, and memory 108. In embodiments, coherent computer system 100 may include other components as described with reference to computer 1101 illustrated in FIG. 4. In embodiments, coherent computer system 100 may be communicatively coupled to one or more other computing systems within a cloud computing environment, such as cloud computing environment 50 illustrated in FIG. 5.

Processor 102 in coherent computer system 100 contains a bus interconnection fabric which enables the one or more cores therein to communicate and coherently share system memory. For example, processor 102 may be connected to memory 108 by bus 110, and processor 102 and memory 108 may be connected to CAD 104 by I/O bus interface 112 via bus 110 and bus 114. For example, the interconnection fabric may be a peripheral component interconnect express (PCIe) topology.

Additionally, processor 102 includes a memory controller (MC) 116 that controls a discrete memory 108. If coherent computer system 100 includes multiple discrete memories 108, processor 102 includes multiple MCs 116 associated with respective discrete memories 108. Processor 102 also includes host bridge 118 to bridge to coherent accelerator processor interface (CAPI) 122 and a coherent accelerator processor proxy (CAPP) 120 within the host bridge 118. The CAPP 120 in connection with host bridge 118 are memory coherence, data transfer, interrupt, and address translation agents on the bus interconnection fabric for one or more CADs 104.

Figure 4:
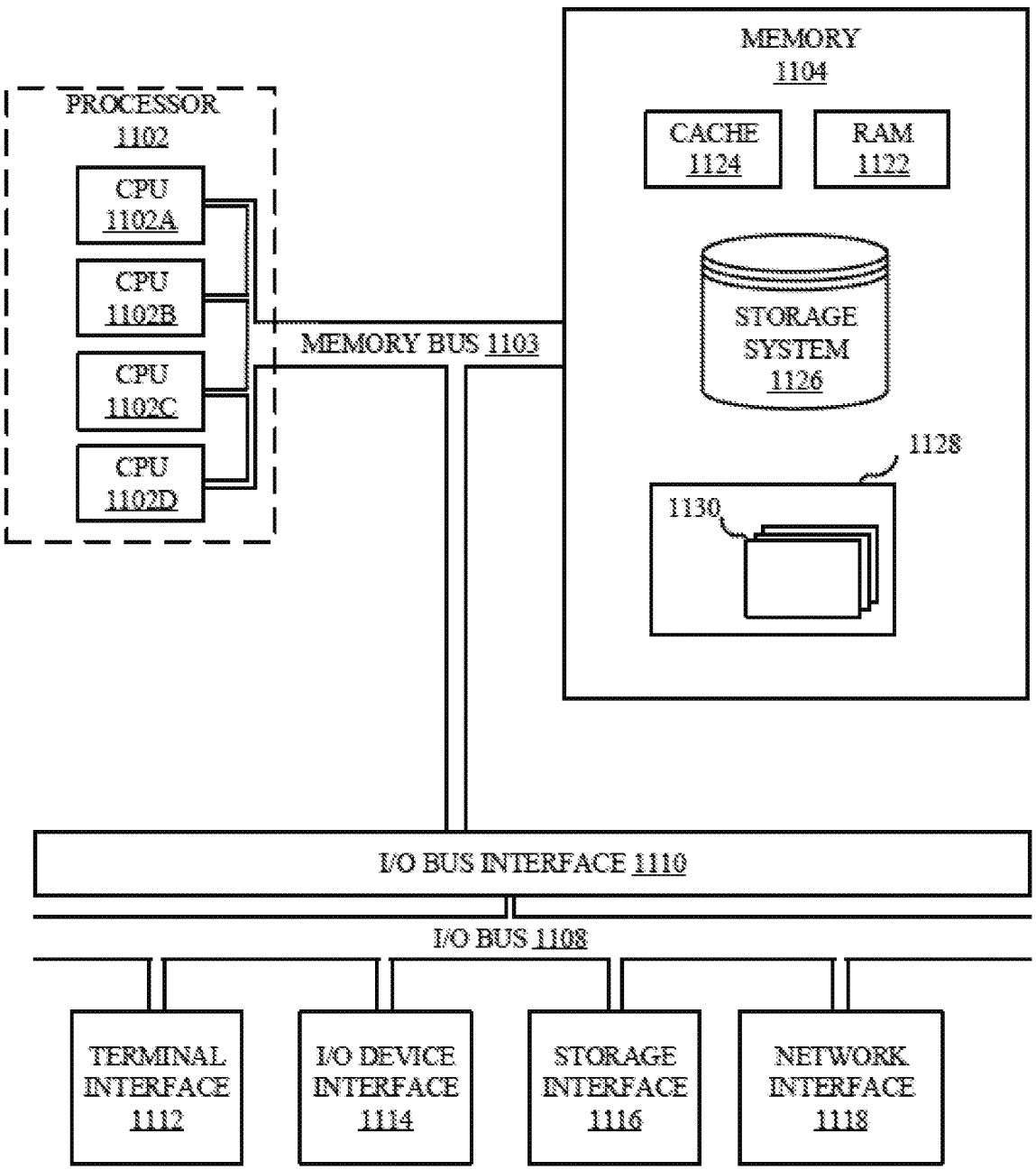
FIG. 4 illustrates a high-level block diagram of an example computer system that may be used in implementing one or more of the methods, tools, and modules, and any related functions, described herein, in accordance with embodiments of the present disclosure.

CAD 104 is a field-programmable gate array (FPGA) or application-specific integrated circuit (ASIC) connected to the processor 102 by the bus interconnection fabric. Each CAD 104 includes a power service layer (PSL) 124 and one or more accelerator function units (AFUs) 126. CAD 104 is located within CAPI 122. CAPI 122 may be a terminal interface 1112, storage interface 1116, I/O interface 1114, or network interface 1118 as illustrated in FIG. 4. When CAD 104 is located in terminal interface 1112, it is a terminal function accelerator; when CAD 104 is located in storage interface 1116, it is a storage function accelerator; when CAD 104 is located in I/O interface 1114, it is a I/O function accelerator; and when CAD 104 is located in network interface 1118, it is a network function accelerator.

The PSL 124 provides the interface to the processor 102. Effective addresses from an AFU 126 are translated to a physical address in system memory 108 by PSL 124. In other words, the PSL 124 provides the translation and interrupt services needed by AFU 126. For example, if the AFU 126 needs to read a particular effective address, it sends that address to PSL 124, the PSL 124 then translates it, fetches the data from memory 108 and returns it to the AFU 126. If the PSL 124 has a translation miss, it interrupts the processor 102, and the processor 102 services the fault.

The AFU 126 is the functional part of the CAD 104 (e.g., the AFU 126 provides the compression, crypto, etc. function). Processor 102 generally has no knowledge of the function of the AFU 126. The combination of PSL 124, host bridge 118, and CAPP 120 provide AFUs 126 with several capabilities. AFUs 126 operate on data in memory 108, coherently, as peers of processor 102 in the system 100. AFUs 126 further use effective addresses to reference memory 108, with address translation provided by the PSL 124. The PSL 124 may also generate interrupts on behalf of AFUs 126 to signal AFU 126 completion, or to signal a system service when a translation fault occurs.

CAD 104 can consist of a single chip, a multi-chip module (or modules), or multiple single-chip modules on a system board or other second-level package, such as an adapter connected to the system board by a connector. Each AFU 126 provides hardware acceleration for functions, such as compression, that an application (e.g., software application) can use for performance improvements. The AFUs 126 can be dedicated to a single application or shared between multiple applications. The purpose of an AFU 126 is to provide applications with a higher computational unit density for hardware acceleration of functions to improve the performance of the application and off-load the processor 102. In embodiments, AFU 126 may be virtualized in software. AFU 126 includes accelerator logic called and run by the AFU 126 to accomplish accelerator functionality carried out by CAD 104. For example, AFU 126 may call and run first logic causing CAD 104 to accelerate the encryption of data for a first application. Similarly, AFU 126 may call and run second logic causing CAD 104 to accelerate the compression of data for a second application.

An application requests use of an AFU 126 using a work element descriptor 128. A work element (e.g., commands to be completed by the AFU) contains the full description of the job to be performed or contain pointers to other main memory structures in the application's memory space. In embodiments, an AFU 126 may be used by any application, or, in other embodiments, an AFU 126 may be dedicated to a single application. The PSL 124 fetches work for an AFU 126 from a work element queue (WQ) 130 located in main memory 108. The WQ 130 is a circular First-In-First-Out (FIFO) buffer with head and tail pointers. The head pointer is the location where the next work queue element is added or enqueued. The tail pointer is the location of the next work queue element to be processed. Work elements are added to the queue by the processor 102 and removed from the queue by PSL 124 or other processors assigned to service the WQ 130.

Virtual memory manager 106 may preemptively utilize memory pages designated for work elements within WQ 130 to perform various memory tasks, processes, functions, etc. (e.g., memory needed for processor 102 operations). In embodiments, to prevent page stealing/demanding/loaning of memory pages designated for CAD 104, work element descriptor 128 utilizes co-processor save area 132 to designate a set of work elements assigned to the CAD 104 for completion. The co-processor save area 132 is accessible by both the CAD 104 and the virtual memory manager 106. The designated set of work elements prevents virtual memory manager 106 from utilizing memory pages assigned for work elements to be performed by the CAD 104.

In some embodiments, the designated set of work elements in the co-processor save area 132 may be advisory or mandatory instructions. For example, in an advisory system 100, the virtual memory manager 106 may disregard the instructions from the CAD 104 to not use memory pages designated for the set of work elements. In a mandatory system 100, the virtual memory manager 106 will not utilize memory pages assigned for work elements to be performed by the CAD 104 until the length of time to complete the work elements decrements to zero.

In embodiments, the set of work elements may be broken down into current work elements and future work elements by the work element descriptor 128. The work element descriptor 128 may determine a length of time needed for completion of each respective work element allowing the virtual memory manager 106 to anticipate when memory pages will be available. In this way, processor 102, which has no knowledge of the work elements assigned to CAD 104, will be prevented from stealing/demanding/loaning memory pages from the CAD 104, thus inhibiting CAD page out when processing work elements for various applications.

FIG. 1 is intended to depict the representative major components of the coherent computer system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the coherent computer system 100 may not be present, and the arrangement of components may vary.

For example, while FIG. 1 illustrates an example coherent computer system 100 having a single processor 102, a single CAD 104, a single virtual memory manager 106, and a single memory 108, suitable architectures for implementing embodiments of this disclosure may include any number of processors, CADs, virtual memory managers, and memories. The various models, modules, systems, and components illustrated in FIG. 1 may exist, if at all, across a plurality of processors, CADs, virtual memory managers, and memories.

Figure 2:
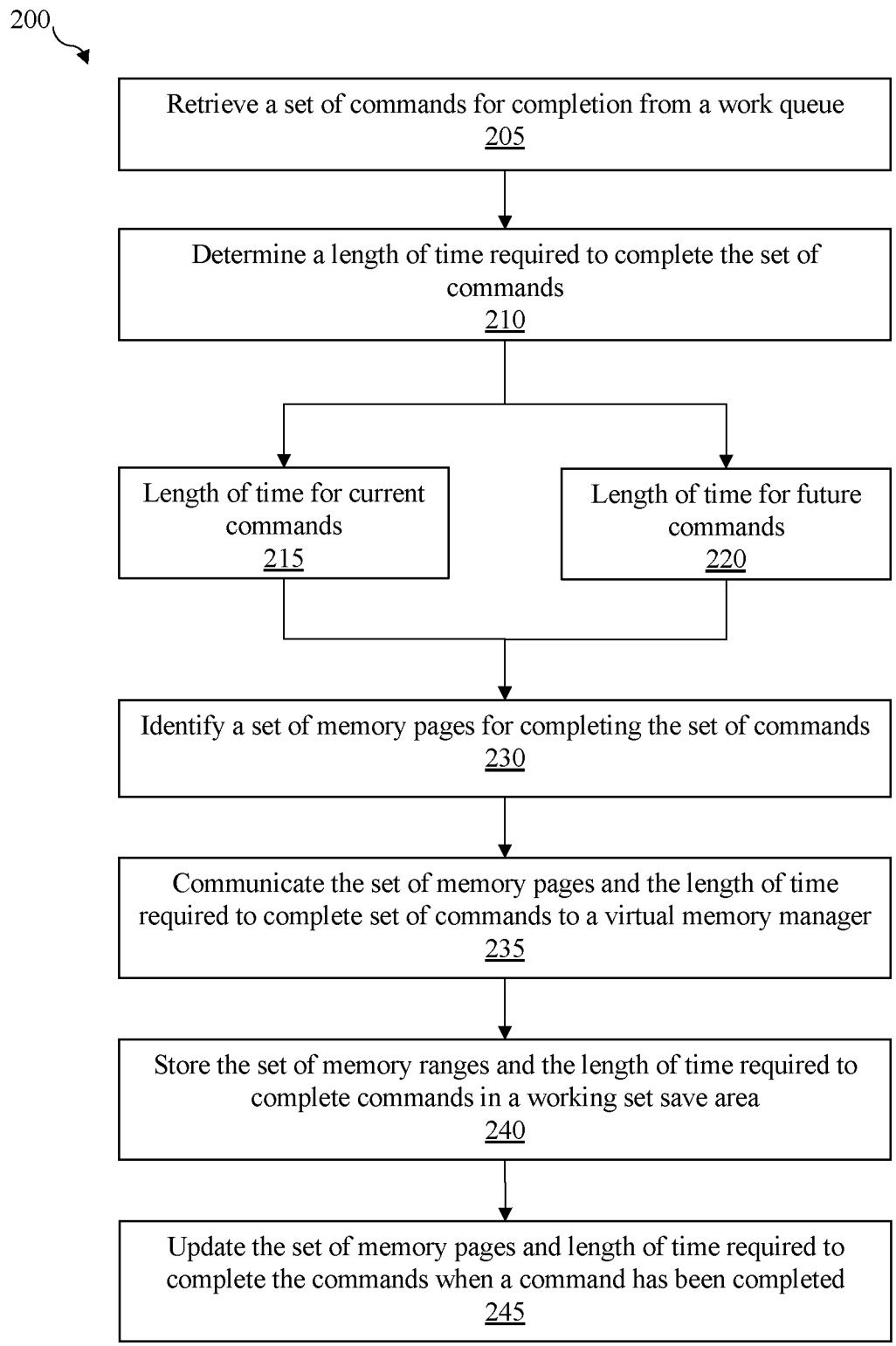
FIG. 2 illustrates a flow diagram of an example process for communicating an identified set of a memory pages designated for use by the CAD to a virtual memory manager, in accordance with embodiments of the present disclosure.

Referring now to FIG. 2, shown is a flow diagram of an example process 200 for communicating an identified set of memory pages designated for use by the CAD to a virtual memory manager, in accordance with embodiments of the present disclosure. The process 200 may be performed by processing logic that comprises hardware (e.g., circuitry, dedicated logic, programmable logic, microcode, etc.), software (e.g., instructions run on a CAD and/or processor), firmware, or a combination thereof. In some embodiments, the process 200 is a computer-implemented process. In embodiments, the process 200 may be performed by AFU 126 of CAD 104 exemplified in FIG. 1.

The process 200 begins by retrieving a set of work elements for completion from a work queue. This is illustrated at step 205. The set of work elements may be any type of commands to be completed by the CAD. For example, the set of work elements may instruct the CAD to perform various accelerating functions such as data compression, encryption, and memory copying tasks requested by an application.

Once the set of work elements are retrieved, the process 200 continues by determining a length of time required to complete the set of work elements. This is illustrated at step 210. In embodiments, the set of work elements may be classified into one or more types of work elements. For example, the set of work elements may be broken down into current work elements (e.g., work elements that are currently being performed by the CAD) and future work elements (e.g., work elements that have not yet begun). In embodiments, a work element descriptor may group the set of work elements into current and future work elements. Once the designation is made, the length of time for completing future work elements (step 215) and the length of time for completing future work elements (step 220) may be determined. The lengths of time for each of the various work elements may be based on historical performance data of the CAD when completing similar work elements. Using historical performance data allows the system to accurately determine the length of time each type of work element (e.g., command) needs for completion.

The process 200 continues by identifying a set of memory pages needed for completing the set of work elements. This is illustrated at step 230. In embodiments, the set of memory pages include current working memory pages and future working memory pages respective to the designated current and future work elements. The CAD may determine the time it takes to complete the set of work elements and scan through the list of the work elements to identify a set of memory ranges over that determined length of time.

For example, work elements to be executed by the CAD are typically cycled through sequentially and the responses are posted when completed. Work element A is designed to utilize memory range 0xAAAAAAAA to 0xBBBBBBBB. Work element B is designed to utilize memory range 0xBBBBBBBB to 0xCCCCCCCC, and so on for each additional work element. The CAD uses AFU logic to observe the time needed to complete respective work elements and scans through the set of work elements to come up with a working set of memory pages needed over the length of time required to complete the list of work elements.

The process 200 continues by communicating the set of memory pages and the length of time required to complete the set of work elements to a virtual memory manager. This is illustrated at step 235. The CAD informs the virtual memory manager of what set of memory pages the CAD will be utilizing over the length of time. In embodiments, the virtual memory manager will not attempt to utilize the identified set of memory pages until the length of time for the completion of the set of work elements decrements to zero. In this way, the virtual memory manger is prevented from utilizing the designated memory pages until the CAD is finished processing the set of work elements.

In embodiments, the process 200 may continue by storing the set of memory pages and the length of time required to complete the set of work elements in a co-processor save area. This is illustrated at step 240. In embodiments, the CAD may store a working list in the co-processor save area that includes the set of memory pages and the length of time required to complete the set of work elements. The co-processor save area is accessible by both the CAD and the virtual memory manager.

In embodiments, the process 200 may continue by updating the length of time and the set of memory pages for completing the set of work elements when one or more work elements of the set has been completed. This is illustrated at step 245. By updating the time lengths and the set of memory pages, the virtual memory manager may determine which work elements are completed, which memory pages are no longer in use, and how long various work elements and utilized memory pages will be appropriated. In this way, virtual memory management algorithms will consider the capabilities of the CAD such that current and future sets of working elements and respective memory pages are not taken when needed by other components of the system (e.g., processors, hypervisor, etc.). This results in an improvement in memory management of the overall system while preventing inefficiencies in CAD performance such as page outs, un-compressions, etc. Knowing the working sets upfront allows the operating system to effectively identify pages to be compressed/loaned, stolen, and/or deduped without reducing the efficiency of the CAD.

Figure 3A:
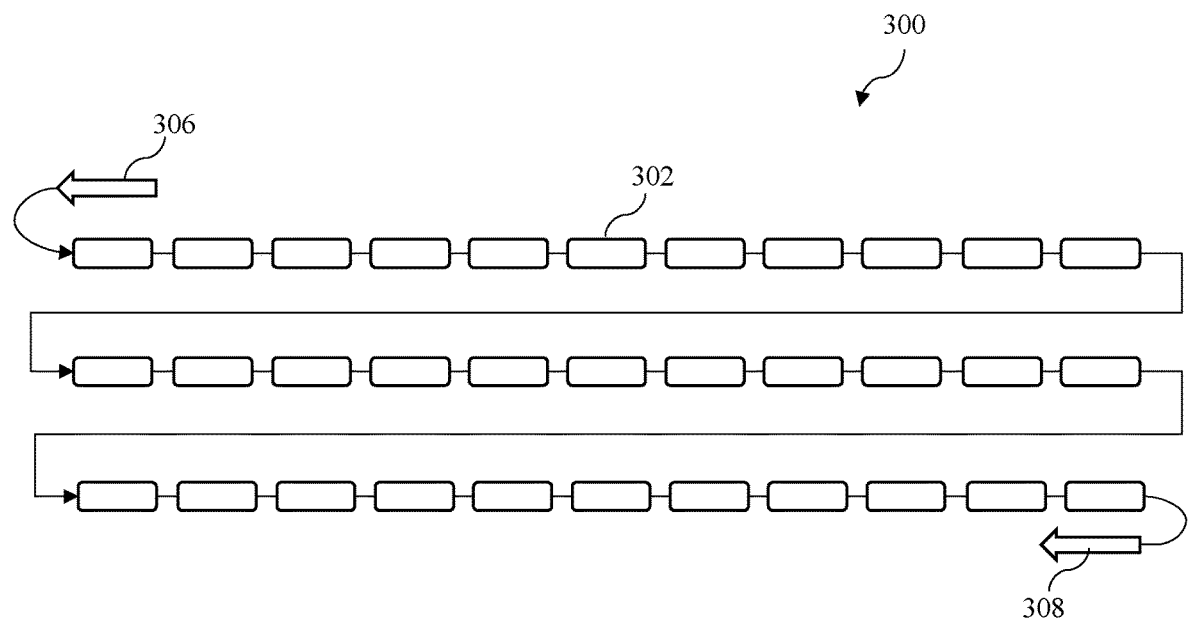
FIG. 3A illustrates an example diagram of a plurality of work elements in a work queue, in accordance with embodiments of the present disclosure.

Referring now to FIG. 3A, shown is an example diagram of a plurality of work elements 302 in a work queue 300, in accordance with embodiments of the present disclosure. Work queue 300 represents a plurality of work elements 302 to be completed by one or more CADs (e.g., co-processors). In the illustrated embodiment, head pointer 306 is the location where the next work element 302 is added or enqueued. Tail pointer 308 is the location of the next work element 302 to be processed. Additionally, the order further indicates the probable order of page stealing, page loaning, compression stealing, etc. by the virtual memory manager.

Figure 3B:
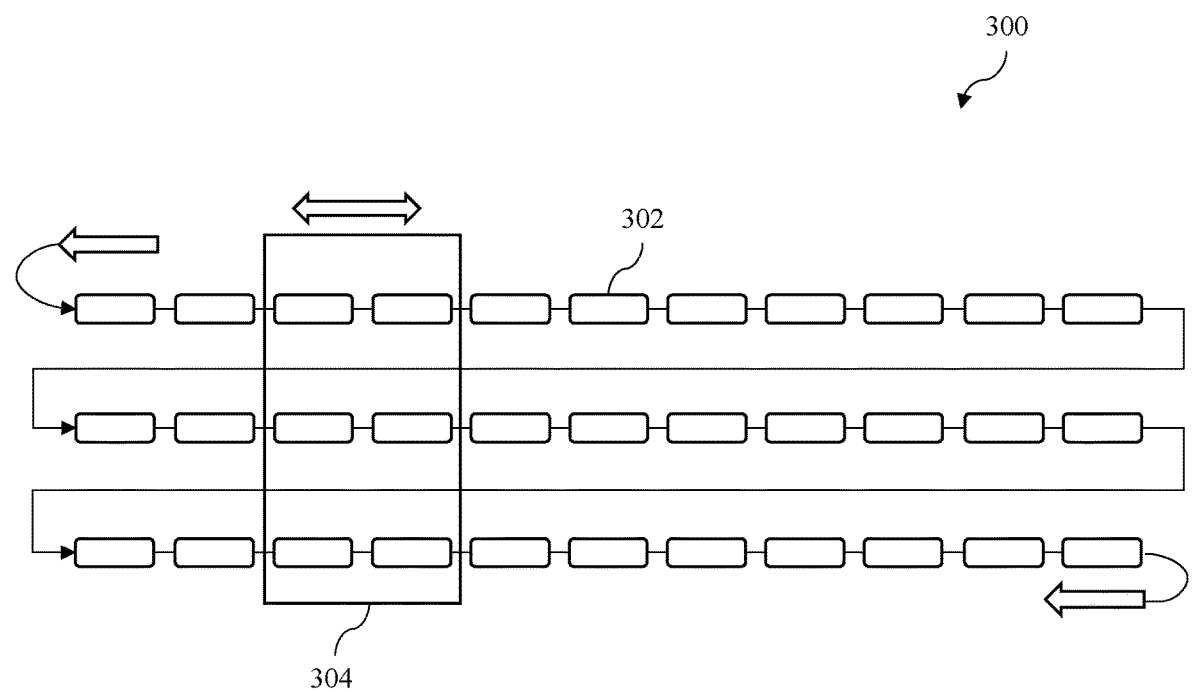
FIG. 3B illustrates an example diagram of a sliding window used to designate a set of work elements for completion by a CAD, in accordance with embodiments of the present disclosure.

Referring now to FIG. 3B, shown is an example diagram of a sliding window 304 used to designate a set of work elements 302 for completion by a CAD, in accordance with embodiments of the present disclosure. In embodiments, the CAD may utilize sliding window 304 to indicate to a virtual memory manager the set of work elements 302 to be completed by the CAD. The set of work elements 302 within the sliding window 304 further correspond to a set of memory pages need for completion of the work elements such that the memory pages will not be stolen by the virtual memory manager to perform other processes. In this way, the sliding window 304 allows the CAD to communicate with the virtual memory manger which memory pages are in use for performing current work elements and which memory pages will be needed for future work elements, allowing the CAD to complete various work elements 302 within the work queue 300 without being inhibited by page stealing, loaning, etc. The virtual memory manager will skip stealing memory pages designated to work elements 302 within the sliding window 304 when utilizing the memory from the work queue 300.

Referring now to FIG. 4, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

In embodiments, the computer system 1101 may be communicatively connected to coherent accelerator processor interface (CAPI) 122 as detailed in FIG. 1. CAPI 122 may include a platform for facilitating implementation of software-specific, computation-heavy algorithms on a field-programmable gate array (FPGA).

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 4 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 1101. In some embodiments, however, individual components may have greater or lesser complexity than as represented in FIG. 4, components other than or in addition to those shown in FIG. 4 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
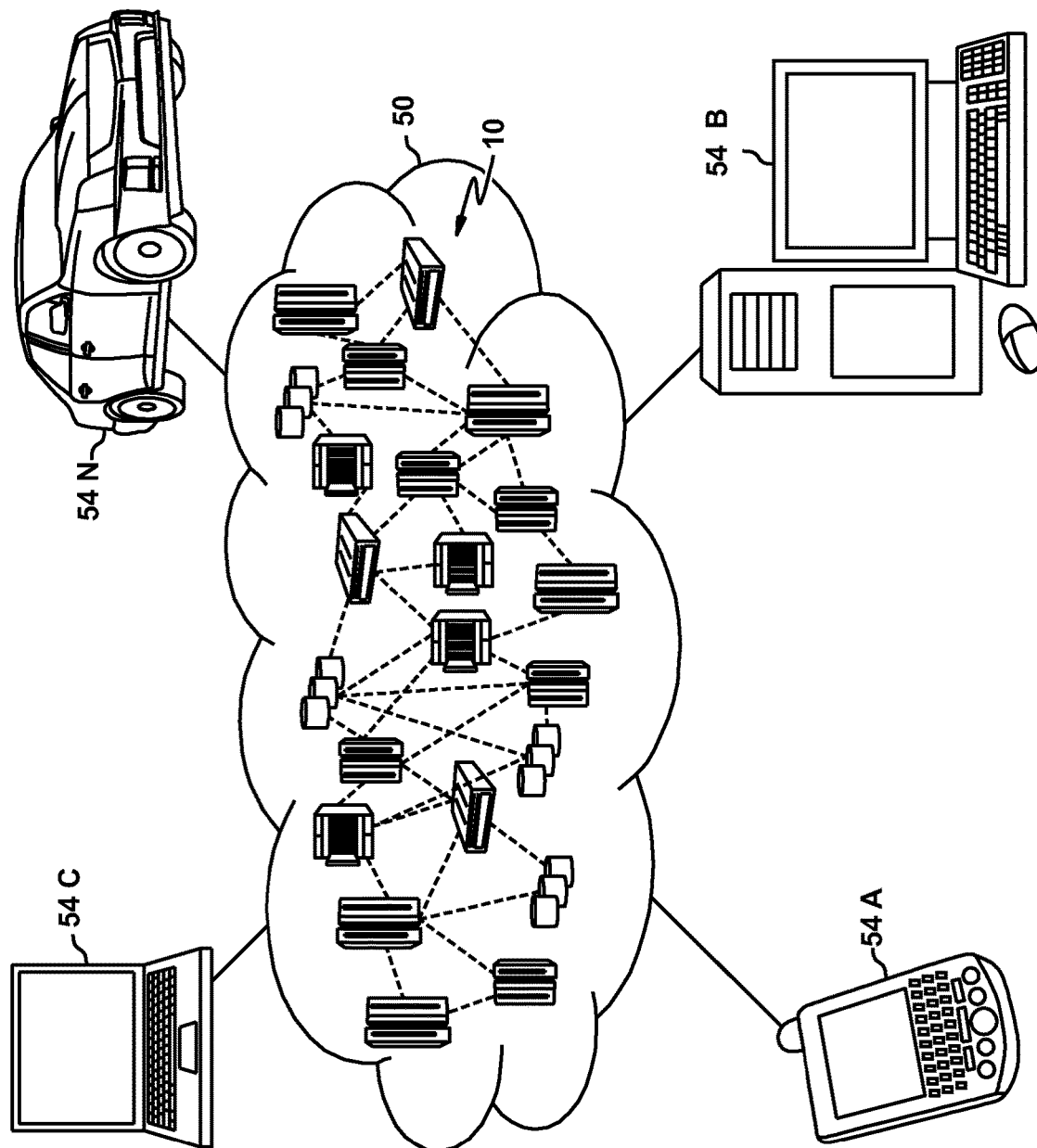
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
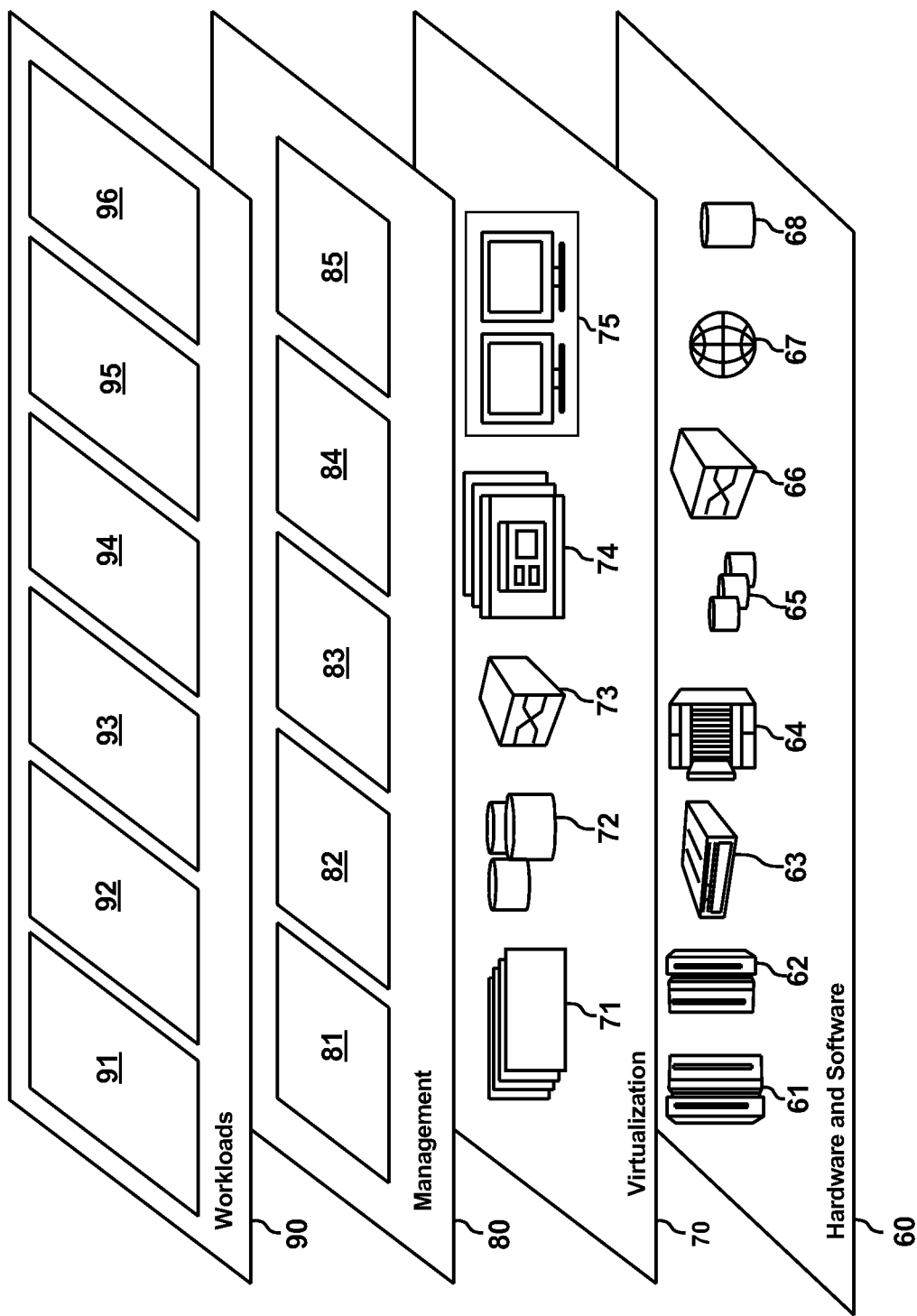
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
retrieving, by a coherent accelerator device (CAD), a set of work elements needed for completion from a work queue;
determining, by the CAD, a length of time required to complete the set of work elements based on historical performance data for completing a similar set of work elements;
identifying, by the CAD scanning the set of work elements using accelerator function unit (AFU) logic, a set of memory pages of a memory needed for completing the set of work elements over the determined length of time, wherein the memory is shared by the CAD and a virtual memory manager;
communicating, by the CAD, the set of work elements in the work queue, the set of memory pages, and the length of time required to complete the set of work elements to the virtual memory manager;
designating, by the CAD, the set of work elements in the work queue using a sliding window, wherein the work queue is divided into a plurality of segments and the set of work elements designated by the sliding window encompasses non-consecutive work elements from the plurality of segments; and inhibiting, by the CAD, the virtual memory manager from utilizing the set of memory pages that correspond to the set of work elements designated in the sliding window.

2. The computer-implemented method of claim 1, further comprising:
updating, by the CAD, the length of time required to complete the set of work elements and the set of memory pages needed for completing the set of work elements when one or more work elements have been completed.

3. The computer-implemented method of claim 1, wherein the set of work elements comprises one or more current work elements and one or more future work elements.

4. The computer-implemented method of claim 3, wherein a work element descriptor groups the set of work elements into current work elements and future work elements.

5. The computer-implemented method of claim 3, wherein the set of memory pages comprises current working memory pages and future working memory pages for completing the set of work elements.

6. The computer-implemented method of claim 1, wherein the virtual memory manager does not utilize the set of memory pages until the length of time required to complete the set of work elements decrements to zero.

7. The computer-implemented method of claim 1, wherein the virtual memory manager ignores the communicating and utilizes the set of memory pages prior to the length of time required to complete the set of work elements decrementing to zero.

8. A coherent computer system, comprising:
a processor;
a coherent accelerator device (CAD); and
a computer-readable storage medium communicatively coupled to the processor and the CAD, storing program instructions which, when executed by the CAD, cause the CAD to perform a method comprising:
retrieving a set of work elements for completion from a work queue;
determining a length of time required to complete the set of work elements based on historical performance data for completing a similar set of work elements;
identifying, by scanning the set of work elements using accelerator function unit (AFU) logic, a set of memory pages of a memory needed for completing the set of work elements over the determined length of time, wherein the memory is shared by the CAD and a virtual memory manager;
communicating the set of work elements, the set of memory pages, and the length of time required to complete the set of work elements to the virtual memory manager;
designating the set of work elements in the work queue using a sliding window, wherein the work queue is divided into a plurality of segments and the set of work elements designated by the sliding window encompasses non-consecutive work elements from the plurality of segments; and
inhibiting the virtual memory manager from utilizing the set of memory pages that correspond to the set of work elements designated in the sliding window.

9. The coherent computer system of claim 8, wherein the method performed by the CAD further comprises:
updating the length of time required to complete the set of work elements and the set of memory pages needed for completing the set of work elements when one or more work elements have been completed.

10. The coherent computer system of claim 8, wherein a work element descriptor groups the set of work elements into current work elements and future work elements.

11. The coherent computer system of claim 8, wherein the virtual memory manager does not utilize the set of memory pages until the length of time required to complete the set of work elements decrements to zero.

12. A computer program product comprising a computer-readable storage medium having program instructions embodied therewith, wherein the computer-readable storage medium is not a transitory signal per se, the program instructions executable by a coherent accelerator device (CAD) to cause the CAD to perform a method comprising:
retrieving a set of work elements for completion from a work queue;
determining a length of time required to complete the set of work elements based on historical performance data for completing a similar set of work elements;
identifying, by scanning the set of work elements using accelerator function unit (AFU) logic, a set of memory pages of a memory needed for completing the set of work elements over the determined length of time, wherein the memory is shared by the CAD and a virtual memory manager;
communicating the set of work elements, the set of memory pages, and the length of time required to complete the set of work elements to the virtual memory manager;
designating the set of work elements in the work queue using a sliding window, wherein the work queue is divided into a plurality of segments and the set of work elements designated by the sliding window encompasses non-consecutive work elements from the plurality of segments; and
inhibiting the virtual memory manager from utilizing the set of memory pages that correspond to the set of work elements designated in the sliding window.

13. The computer program product of claim 12, wherein the method performed by the CAD further comprises: updating the length of time required to complete the set of work elements and the set of memory pages needed for completing the set of work elements when one or more work elements have been completed.

14. The computer program product of claim 12, wherein a work element descriptor groups the set of work elements into current work elements and future work elements.

15. The computer-implemented method of claim 1, wherein the work queue is a First-In-First-Out (FIFO) buffer comprising a plurality of work elements in a chronological order, wherein a head pointer is where one or more work elements are added and a tail pointer is where a work element is processed.

16. The computer-implemented method of claim 1, wherein the set of work elements designated by the sliding window are updated in response to a first work element of the set of work elements being completed.

* * * * *